(12) United States Patent
Park et al.

(10) Patent No.: US 9,040,448 B2
(45) Date of Patent: May 26, 2015

(54) METHOD OF MANUFACTURING SPHERICAL MESOPOROUS SILICA CONTAINING DISPERSED SILVER NANOPARTICLES, AND SPHERICAL MESOPOROUS SILICA MANUFACTURED BY SAID METHOD

(75) Inventors: Chung Kwon Park, Busan (KR); Sang Cheol Han, Busan (KR)

(73) Assignee: THERMOLON KOREA CO., LTD., Busan (KR)

( * ) Notice: Subject to any disclaimer, the term of this patent is extended or adjusted under 35 U.S.C. 154(b) by 410 days.

(21) Appl. No.: 13/640,953
(22) PCT Filed: Oct. 13, 2010
(86) PCT No.: PCT/KR2010/007012
§ 371 (c)(1), (2), (4) Date: Oct. 12, 2012
(87) PCT Pub. No.: WO2011/129502
PCT Pub. Date: Oct. 20, 2011

(65) Prior Publication Data
US 2013/0052115 A1 Feb. 28, 2013

(30) Foreign Application Priority Data
Apr. 12, 2010 (KR) .......... 10-2010-0033472

(51) Int. Cl.
*B01J 23/66* (2006.01)
*B01J 20/28* (2006.01)
*B82Y 30/00* (2011.01)
*B01J 20/30* (2006.01)
*B01J 20/02* (2006.01)
*B01J 20/10* (2006.01)

(52) U.S. Cl.
CPC .......... *B01J 20/28007* (2013.01); *B82Y 30/00* (2013.01); *C01P 2002/72* (2013.01); *C01P 2004/03* (2013.01); *C01P 2004/32* (2013.01); *C01P 2004/62* (2013.01); *C01P 2004/64* (2013.01); *C01P 2006/12* (2013.01); *B01J 20/28097* (2013.01); *B01J 20/3085* (2013.01); *B01J 20/3057* (2013.01); *B01J 20/0233* (2013.01); *B01J 20/103* (2013.01); *B01J 20/28083* (2013.01)

(58) Field of Classification Search
CPC ...... C01B 33/16; C01B 33/18; C01B 33/182; C01B 33/126; B01J 23/66; B01J 20/10
USPC ........................ 423/335, 338; 502/233, 243
See application file for complete search history.

(56) References Cited

U.S. PATENT DOCUMENTS 4,939,114 A * 7/1990 Nojiri et al. .................. 502/348
2008/0176059 A1* 7/2008 Benoit et al. ............... 428/315.5

*Primary Examiner* — Kaj K Olsen
*Assistant Examiner* — Pritesh Darji
(74) *Attorney, Agent, or Firm* — John K. Park; Park Law Firm

(57) ABSTRACT

The present invention relates to a method of preparing a spherical mesoporous silica structure containing silver nanoparticles dispersed therein by adding a silver nitrate solution to an aqueous surfactant solution and performing a sol-gel process and to spherical mesoporous silica prepared thereby. The spherical mesoporous silica is cost-effective compared to a conventional method that uses silver nanoparticles as a raw material, because the silver nitrate solution that is inexpensive compared to silver nanoparticles is used. Also, the spherical mesoporous silica can be with high productivity in large amounts, and thus is easily commercialized. Moreover, because silver nanoparticles are incorporated into the pores of the mesoporous silica, the silver nanoparticles are used stably and do not change color and odor. In addition, the spherical mesoporous silica exhibits various additional effects, including far-infrared ray emission and deodorization, attributable to silica.

18 Claims, 8 Drawing Sheets

(a)  (b)  (c)

(a)  (b)

(a)  (b)  (c)  (d)

METHOD OF MANUFACTURING SPHERICAL MESOPOROUS SILICA CONTAINING DISPERSED SILVER NANOPARTICLES, AND SPHERICAL MESOPOROUS SILICA MANUFACTURED BY SAID METHOD

TECHNICAL FIELD

The present invention relates to a method for preparing a spherical mesoporous silica structure containing silver nanoparticles dispersed therein, and more particularly to a method of preparing spherical mesoporous silica including silver nanoparticles by adding a silver nitrate solution to an aqueous surfactant solution and performing a sol-gel process and to spherical mesoporous silica prepared thereby, in which silver nanoparticles are dispersed and contained in the spherical mesoporous silica so that they do not leak out, and the spherical mesoporous silica can be easily prepared in a high yield in large amounts.

BACKGROUND ART

In recent years, silver nanoparticles have been applied in various industrial fields, because they have various effects, including sterilizing and deodorizing effects. However, there have been frequent reports that silver nanoparticles are absorbed into the human body through skin tissue or a respiratory organ to give harm to the human body. Thus, problems associated with the safety of the use of silver nanomaterials have been frequently discussed.

In an attempt to overcome the above problems by increasing the dispersibility of silver nanoparticles, methods of adsorbing or binding silver nanoparticles to other materials have been reported. For example, Korean Patent Registration No. 764535 discloses a dispersion of metal nanoparticles and a preparation method thereof. However, materials which are used in the above patent are mostly organic compounds such as dodecylamine or oleic acid, which are subjected to a reduction reaction in a subsequent process. In this reduction reaction, metal powder is separated from the organic compounds, and the binding strength between the metal powder and the organic compounds is significantly reduced. Due to such problems, there are limitations in ensuring the stability of silver nanoparticles.

In addition, Korean Patent Registration No. 10-0806915 discloses a method for binding silver nanoparticles to silica. In this method, silica powder is dispersed together with sufficient amounts of a silver ion precursor and a stabilizing agent at a temperature of about 100 □ and an alkaline pH, and a reducing agent is added thereto while controlling stirring speed and stirring conditions. This method has problems in that the preparation process is complex, high temperature and basic conditions are required and large amounts of various compounds should be added. Silver particles bound by this method have a large particle size and adhere to the outer surface of silica so that they are likely to be detached from silica. Thus, this method has limitations in ensuring the stability of silver nanoparticles.

In addition, Korean Patent Laid-Open Publication No. 10-2007-006887 discloses a method of preparing reverse micelle nanoparticles using an organic solvent. As shown in FIG. 1a, magnetite ($Fe_3O_4$) micelles of inorganic nanoparticles which can be included in silica nanoparticles are formed in an organic solvent. Then, as shown in FIG. 1b, the magnetite ($Fe_3O_4$) micelles of inorganic nanoparticles are self-assembled into reverse micelles by a sol-gel reaction with a hydrophilic group in an aqueous solution containing a surfactant (such as oleic acid) dispersed therein, thereby making magnetite ($Fe_3O_4$) nanoparticles (Nat. Materials, 2004, 3, 891-895). Then, as shown in FIG. 1c, the nanoparticles are allowed to react with a surfactant as a template in an aqueous micelle solution, thereby forming mesoporous silica. This method has problems in that the preparation process is complex and is uneconomical, because expensive inorganic nanoparticles are included in mesoporous silica nanoparticles. Also, the process of making mesoporous silica nanoparticles is not environmentally friendly, because it is carried out using a volatile organic solvent (chloroform) and ethyl acetate under basic conditions caused by ammonia. In addition, this method is cost-ineffective, because two kinds of surfactants (oleic acid and CTAB) are used.

In a paper relating to a method for preparing spherical mesoporous silica containing nanosized silver (Hae-Joon Park et al., "New synthetic product of silica containing nanosized silver for inhibiting various plant diseases", Plant Pathol. J. 22(3), 295-302, 2006), silver-containing silica is prepared by adding a soluble polymer, silver nitrate and sodium silicate ($Na_2SiO_3$) to distilled water. In this paper, as shown in FIG. 1(a), PVP, sodium silicate and silver nitrate are dissolved in IPA by irradiation of 25 kGy of gamma rays and subjected to a sol-gel reaction in a nitrogen atmosphere, and as a result, three kinds of nanoparticle materials are randomly present and nanoparticles are actually prepared as shown in FIG. 2(b). However, it can be seen that silica and silver nanostructures are not complete structures. In other words, the binding between silica structures and silver nanoparticles is loose and silver nanoparticles are non-uniform and likely to be separated. In addition, in a paper (Jae-Hyun Park et al., "Preparation of silver/mesoporous silica by direct reaction of silver and silver/functional mesoporous silica by silver-adsorbed structures", Materials Letters 61, 156-159, 2007), a method for introducing silver nanoparticles into a mesoporous material is described. In this method, the surface of a mesoporous material is treated with mercaptopropyl silane which is a functional group, and particles are bound to the surface, followed by synthesis. In this method, the production cost is high, the synthesis process is difficult to carry out, and the uniformity of particles is problematic.

DISCLOSURE OF INVENTION

Technical Problem

Korean Patent Application No. 10-2009-961 filed by the present inventor discloses silver nanoparticle-containing silica nanotubes having high dispersion ability and a preparation method thereof. It is an object of the present invention to improve the method of the above patent application and to provide a method for preparing spherical mesoporous silica containing silver nanoparticles dispersed therein and spherical mesoporous silica prepared, thereby, in which the silver nanoparticles do not leak out because they are contained and dispersed in the spherical mesoporous silica, and the spherical mesoporous silica can be easily prepared in a high yield in large amounts.

Korean Patent Laid-Open Publication No. 10-2007-006887 discloses a method of mesoporous silica nanoparticles containing inorganic nanoparticles therein by dispersing an inorganic nanoparticle-dispersed organic solvent directly in an aqueous surfactant solution. This preparation method is uneconomical, because it uses expensive inorganic nanoparticles as a raw material. Another object of the present invention is to provide a method for preparing spherical mesoporous silica containing silver nanoparticles therein and spherical mesoporous silica prepared thereby, in which the preparation method is cost-effective because it uses a silver nitrate solution which is inexpensive compared to nanoparticles, and the spherical mesoporous silica can be produced with high productivity in large amounts.

In addition, Korean Patent Laid-Open Publication No. 10-2007-006887 discloses dispersing inorganic nanoparticles in an aqueous surfactant solution. Still another object of the present invention is to provide spherical mesoporous silica containing silver nanoparticles dispersed therein and spherical mesoporous silica prepared thereby, in which an aqueous silver nitrate solution is dispersed directly in an aqueous surfactant solution so that silver nanoparticles are incorporated into the pores of mesoporous silica, and thus the silver nanoparticles can be used stably and do not change color and odor, and the spherical mesoporous silica exhibits various additional effects, including far-infrared ray emission and deodorization, attributable to silica.

Technical Solution

In one embodiment, the present invention provides a method of preparing mesoporous silica by a post-reduction process in which silver nitrate is reduced into silver nanoparticles by a reducing agent after addition of a template. In another embodiment, the present invention provides a method of preparing mesoporous silica by a pre-reduction process in which silver nitrate is reduced into silver nanoparticles by a reducing agent before addition of a template.

The method of preparing spherical mesoporous silica containing silver nanoparticles dispersed therein by the post-reduction process according to one embodiment of the present invention comprises the steps of:

(P100) adding a template to an aqueous alcohol solution, and then heating and dissolving the template, followed by cooling to room temperature, thereby forming a gel having a micelle structure (a gel solution-forming step);

(P200) adding a 5% silver nitrate solution to the gel solution to form an aqueous solution of a silver ion-amine complex compound (a complex compound micelle-forming step);

(P300) adding a silica precursor to the gel solution containing the silver ion-amine complex compound formed therein, followed by stirring to form spherical mesoporous silica by a sol-gel process and to attach the silver ion-amine complex compound to the inside of the spherical mesoporous silica (an immobilization step);

(P400) adding a reducing agent to convert the silver ions in the silver ion-amine complex compound attached to the inside of the spherical mesoporous silica to silver nanoparticles (a silver nanoparticle conversion step); and (P500) filtering the spherical mesoporous silica using a vacuum system, removing the remaining reducing agent from the filtered spherical mesoporous silica, and removing dodecylamine present in the spherical mesoporous silica with hot ethanol, followed by drying (a post-treatment step).

The method of preparing spherical mesoporous silica containing silver nanoparticles dispersed therein by the pre-reduction process according to another embodiment of the present invention comprises the steps of:

(S100) adding a template to an aqueous alcohol solution, and then heating and dissolving the template, followed by cooling to room temperature, thereby forming a gel having a micelle structure (a gel solution-forming step);

(S200) adding a 5% silver nitrate solution to the gel solution to form an aqueous solution of a silver ion-amine complex compound (a complex compound micelle-forming step);

(S300) adding a reducing agent to convert the silver ions in the silver ion-amine complex compound to silver nanoparticles (a silver nanoparticle conversion step);

(S400) adding a silica precursor to the gel solution containing the silver nanoparticles dispersed therein, followed by stirring to form spherical mesoporous silica by a sol-gel process and to attach the silver nanoparticles to the inside of the spherical mesoporous silica (an immobilization step); and (S500) filtering the spherical mesoporous silica using a vacuum system, removing the remaining reducing agent from the filtered spherical mesoporous silica, and removing dodecylamine present in the spherical mesoporous silica with hot ethanol, followed by drying (a post-treatment step).

In the present invention, the aqueous alcohol solution is preferably a mixture of 5-10 wt % of alcohol and 90-95 wt % of purified water.

The template is preferably added in an amount of 1.0 mole per 20-24 L to form the micelle structure.

The 5% silver nitrate solution is preferably added in an amount of 0.1-0.3 moles per mole of the template.

The precursor is preferably added in an amount of 3.6-4.4 moles per mole of the template.

The reducing agent is preferably added in an amount of 0.2-0.6 moles per mole of the template.

The template is preferably one or more selected from among alkylamines having 1 to 16 carbon atoms.

The alcohol is preferably one or more selected from among ethanol, methanol, propanol, butanol and pentanol.

The silica precursor is preferably one selected from among tetraethoxyorthosilicate (TEOS), tetramethoxyorthosilicate (TMOS), tetrapropoxyorthosilicate (TPOS), tetrabutoxyorthosilicate (TBOS), tetrapentoxyorthosilicate (TPEOS), tetra(methylethylketoxime)silane, vinyl oxime silane (VOS), phenyl tris(butanone oxime)sliane (POS), and methyl oxime silane (MOS).

The reducing agent is preferably one or more selected from among $NaBH_4$, $NH_2NH_2$, $NH_3$, and $H_2S$.

The present invention also provides spherical mesoporous silica containing silver nanoparticles dispersed therein, prepared by the above preparation method.

Advantageous Effects

According to the present invention, spherical mesoporous silica containing silver nanoparticles dispersed therein is prepared by adding a silver nitrate solution to an aqueous surfactant solution and performing a sol-gel process. Thus, the present invention is cost-effective compared to a conventional method that uses silver nanoparticles as a raw material, because the silver nitrate solution that is inexpensive compared to silver nanoparticles is used. Also, the spherical mesoporous silica can be with high productivity in large amounts, and thus can be easily commercialized. Moreover, because silver nanoparticles are incorporated into the pores of the mesoporous silica, the silver nanoparticles are used stably and do not change color and odor. In addition, the mesoporous silica of the present invention exhibits various additional effects, including far-infrared ray emission and deodorization, attributable to silica.

BEST MODE FOR CARRYING OUT THE INVENTION

Figure 1:
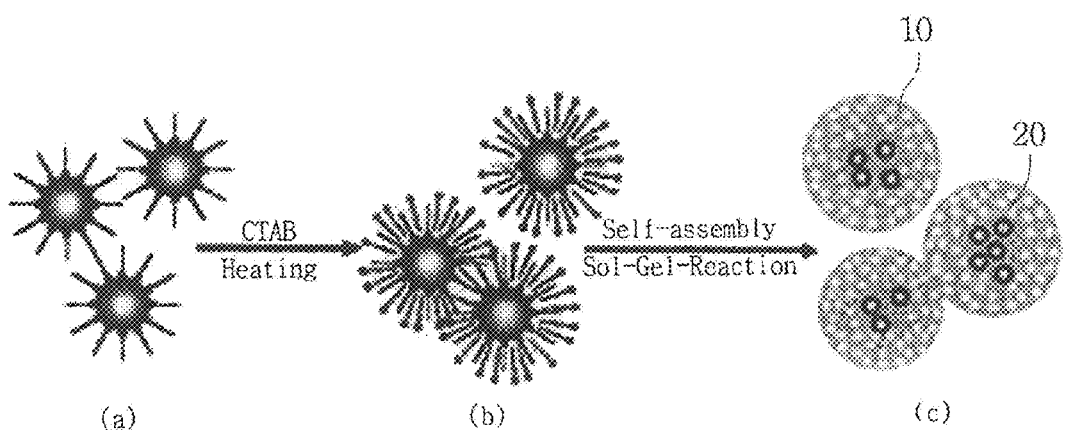
FIG. 1 shows each step of a method for preparing mesoporous silica containing inorganic nanoparticles dispersed therein according to the prior art.
Figure 2:
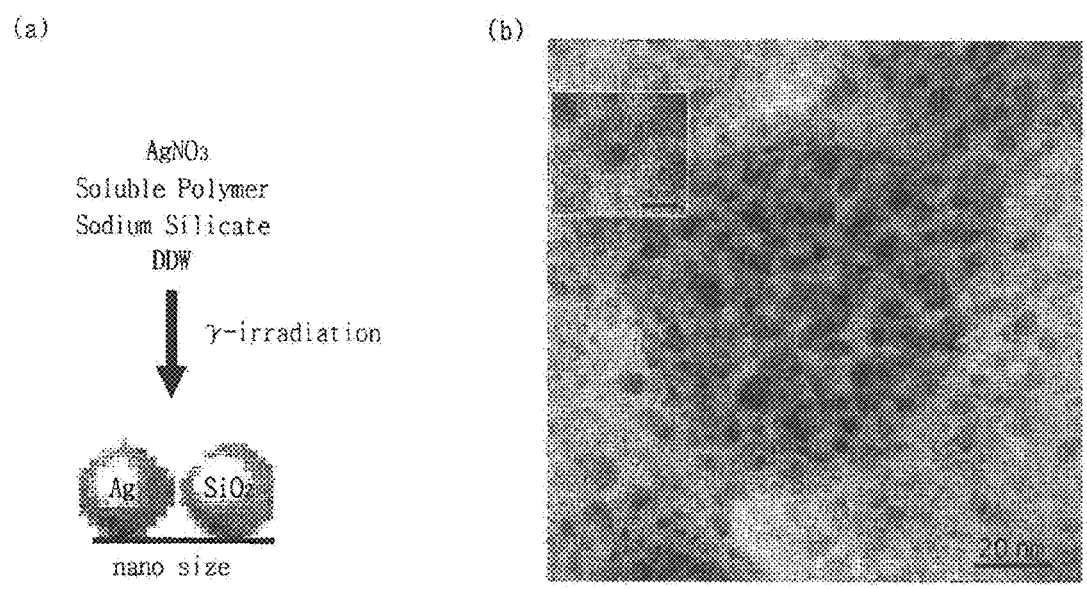
FIG. 2 is a TEM photograph of spherical mesoporous silica containing nanosized silver, prepared according to the prior art method.

Hereinafter, preferred embodiments of the present invention will be described in detail with reference to FIGS. 3 to 15 wherein like elements are indicated by like reference numerals. Meanwhile, in each of FIGS. 3 to 16 and the detailed description, the description of elements and effects which are obvious to those skilled in the art will be simplified or omitted.

In one embodiment, the present invention provides a method of preparing mesoporous silica by a post-reduction process in which silver nitrate is reduced into silver nanoparticles by a reducing agent after addition of a template. In another embodiment, the present invention provides a method of preparing mesoporous silica by a pre-reduction process in which silver nitrate is reduced into silver nanoparticles by a reducing agent before addition of a template.

Figure 3:
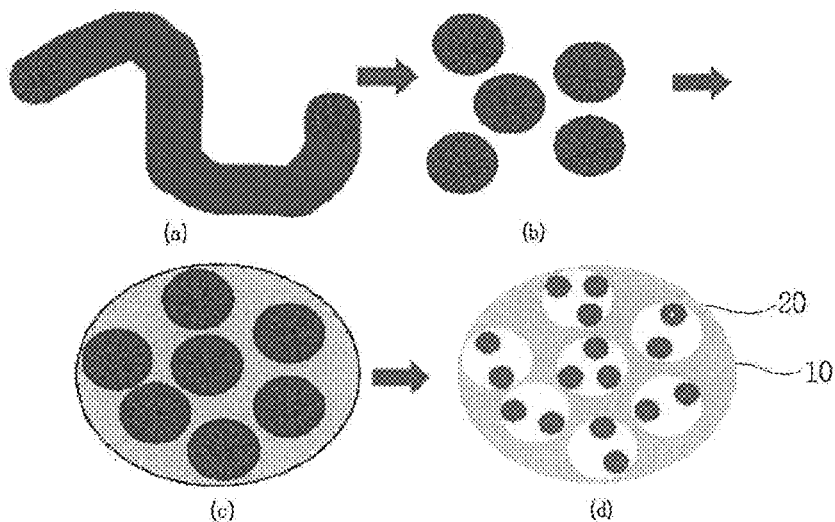
FIG. 3 shows each step of a method for preparing spherical mesoporous silica containing silver nanoparticles dispersed therein according to one embodiment of the present invention.

The characteristics of the post-reduction process according to the present invention are shown in FIG. 3. As shown in FIG. 3($a$), an alkylamine template as a chelating reactant forms a micelle structure in an aqueous solution, and when silver ions are added thereto, the template reacts with the silver ions to form micelles of a silver ion-amine complex compound as shown in FIG. 3($b$). Then, as shown in FIG. 3($c$), a silica precursor is added thereto, so that spherical mesoporous silica is formed by a sol-gel process and the silver ion-amine complex compound is attached to the inside of spherical mesoporous silica. Then, as shown in FIG. 3($d$), a reducing agent is added so that silver ions in the silver ion-amine complex compound attached to the inside of the spherical mesoporous silica 10 are converted to silver nanoparticles, thereby preparing spherical mesoporous silica containing silver nanoparticles 20 dispersed therein.

Figure 4:
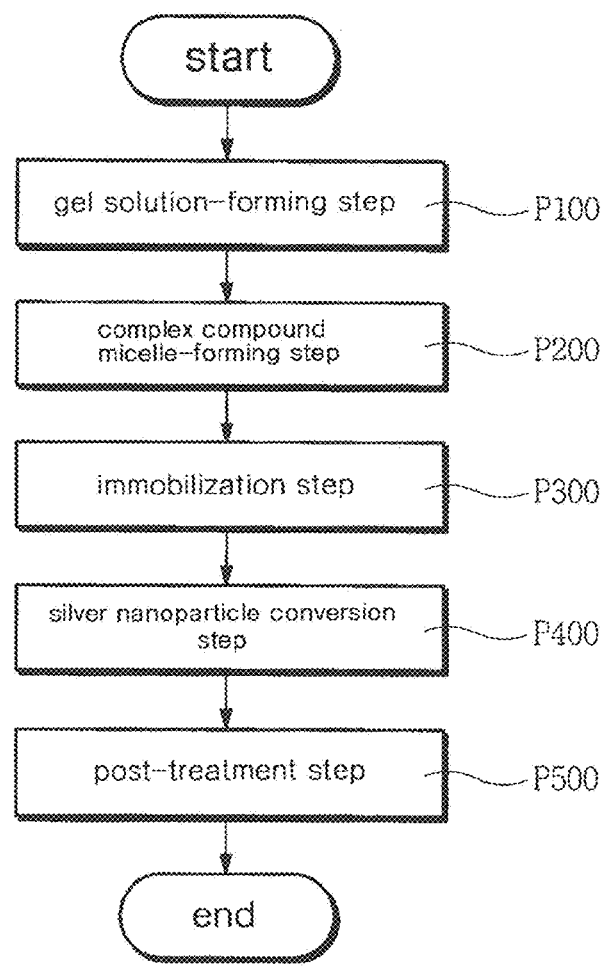
FIG. 4 is a process block diagram showing a method for preparing spherical mesoporous silica containing silver nanoparticles dispersed therein according to one embodiment of the present invention.

The method of preparing spherical mesoporous silica containing silver nanoparticles dispersed therein by the post-reduction process according to one embodiment of the present invention will now be described in detail with reference to FIGS. 3 and 4. The method according to one embodiment of the present invention comprises the steps of:

(P100) adding a template to an aqueous alcohol solution, and then heating and dissolving the template, followed by cooling to room temperature, thereby forming a gel having a micelle structure (a gel solution-forming step);

(P200) adding a 5% silver nitrate solution to the gel solution to form an aqueous solution of a silver ion-amine complex compound (a complex compound micelle-forming step);

(P300) adding a silica precursor to the gel solution containing the silver ion-amine complex compound formed therein, followed by stirring to form spherical mesoporous silica by a sol-gel process and to attach the silver ion-amine complex compound to the inside of the spherical mesoporous silica (an immobilization step);

(P400) adding a reducing agent to convert the silver ions in the silver ion-amine complex compound, attached to the inside of the spherical mesoporous silica, to silver nanoparticles (a silver nanoparticle conversion step); and (P500) filtering the spherical mesoporous silica using a vacuum system, removing the remaining reducing agent from the filtered spherical mesoporous silica, and removing dodecylamine present in the spherical mesoporous silica with hot ethanol, followed by drying (a post-treatment step).

In the present invention, the gel solution-forming step (P100) is a step of adding a template to an aqueous alcohol solution and stirring the mixture until the aqueous alcohol solution become clear, followed by cooling to room temperature, thereby form a gel having a micelle structure.

The template is stirred at a temperature of 60±1 □ for about 1 hours such that it can be easily dissolved in the aqueous alcohol solution.

The aqueous alcohol solution is preferably a mixture of 5-10 wt % of alcohol and 30-95 wt % of purified water. If the content of alcohol in the mixture is less than 5 wt %, the template will not be sufficiently dissolved, and if the content of alcohol is more than 10 wt %, the template will be diluted in alcohol to reduce the reaction rate, and a large amount of time will be required to recover the template.

Also, the alcohol is preferably one or more selected from among ethanol, methanol, propanol, butanol and pentanol.

The template that is added to the aqueous alcohol solution functions to facilitate the formation of fine pores in the silica precursor. The template is preferably added in an amount of 1.0 mole per 20-24 L of the aqueous alcohol solution to form a micelle structure. If the amount of aqueous alcohol solution added is smaller than the lower limit of the above range, the silica precursor will not be easily dissolved, and if the amount of aqueous alcohol solution added is larger than the upper limit of the above range, self-assembly of the template will be difficult, resulting in a decrease in yield and structural deformation.

The template is preferably one or more selected from among alkylamines having 5 to 16 carbon atoms. Specifically, it is preferably one selected from among dodecylamine, decaneamine, tetradecaneamine and octylamine.

The complex compound micelle-forming step (P200) is a step of adding a 5% silver nitrate solution to the gel solution and stirring the solution at room temperature for 10-15 minutes to form an aqueous solution of a silver ion-amine complex compound. The silver nitrate solution is preferably added in an amount of 0.1-0.3 moles per mole of the template to form an aqueous solution of a silver ion-amine complex compound. If the amount of silver nitrate solution added is less than 0.1 moles, the shape of the template can be irregular, and if it is more than 0.3 moles, it can be difficult to react with the precursor, resulting in a decrease in the reaction yield.

The immobilization step (P300) is a step of adding a silica precursor to the gel solution containing the silver ion-amine complex compound formed therein and then strongly stirring the mixture at room temperature for 1-2 hours to form spherical mesoporous silica by a sol-gel process and to attach the silver ion-amine complex compound to the inside of the spherical mesoporous silica. The silica precursor is preferably added in an amount of 3.6-4.4 moles per mole of the template. If the amount of precursor added is less than 3.6 moles, the amount of silica in the spherical mesoporous silica will be insufficient, and thus the silver ion-amine complex compound will not be completely attached, and if the amount of precursor added is more than 4.4 moles, the silver ion-amine complex compound will be excessive so that the amount of silver ion-amine complex compound attached will be increased, resulting in side reactions.

The silica precursor that is used in the present invention is preferably one or more selected from among tetraethoxyorthosilicate (TEOS), tetramethoxyorthosilicate (TMOS), tetrapropoxyorthosilicate (TPOS), tetrabutoxyorthosilicate (TBOS), tetrapentoxyorthosilicate (TPEOS). tetra(methylethylketoxime)silane, vinyl oxime silane (VOS), phenyl tris (butanone oxime)sliane (POS), and methyl oxime silane (MOS).

The silver nanoparticle conversion step (P400) is a step of adding a reducing agent to convert silver ions in the silver ion-amine complex compound, attached to the inside of the spherical mesoporous silica, to silver nanoparticles. The reducing agent is preferably added in an amount of 0.2-0.6 moles per mole of the template. If the amount of reducing agent added is less than 0.2 moles, the rate of conversion of silver ions in the silver ion-amine complex compound to silver nanoparticles can be reduced, and if the amount of reducing agent added is more than 0.6 moles, the rate of conversion of silver ions in the silver ion-amine complex compound to silver nanoparticles will not significantly increase and an excessive amount of the reducing agent will remain in the gel solution.

The reducing agent that is used in the present invention is preferably one or more selected from among $NaBH_4$, $NH_2NH_2$, $NH_3$ and $H_2S$. In addition to the above-listed reducing agents, the reducing agent is also preferably one or more selected from among inorganic and organic reducing agents, as well as neutral metals having high ionization tendency.

The post-treatment step (P500) is a step of filtering the spherical mesoporous silica using a vacuum system, removing the remaining reducing agent from the filtered spherical mesoporous silica, and removing dodecylamine present in the spherical mesoporous silica, with hot ethanol, followed by drying. In this step, the spherical mesoporous silica is filtered under a vacuum of 10-50 mmHg, and then washed 3-5 times with 200-300 ml of distilled water to remove the remaining reducing agent, after which it is washed 3-5 times with ethanol at 60±1 □ to remove alkylamine from the spherical mesoporous silica, followed by drying at a temperature of 80±2 □ for 24 hours, thereby preparing spherical mesoporous silica containing silver nanoparticles dispersed therein.

Figure 5:
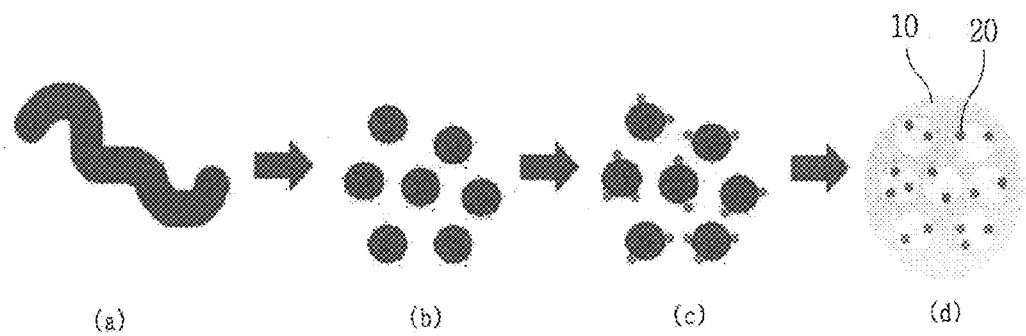
FIG. 5 shows each step of a method for preparing spherical mesoporous silica containing silver nanoparticles dispersed therein according to another embodiment of the present invention.

The characteristics of the pre-reduction process according to another embodiment of the present invention are shown in FIG. 5. As shown in FIG. 5(a), an alkylamine template as a chelating reactant forms a micelle structure in an aqueous solution, and when silver ions are added thereto, the template reacts with the silver ions to form micelles of a silver ion-amine complex compound as shown in FIG. 5(b). Then, as shown in FIG. 5(c), a reducing agent is added to convert silver ions in the silver ion-amine complex compound to silver nanoparticles 20. Then, as shown in FIG. 5(d), a silica precursor is added thereto to form spherical mesoporous silica by a sol-gel process and to attach the silver nanoparticles to the inside of the spherical mesoporous silica. Then, the alkylamine template is removed, thereby preparing spherical mesoporous silica containing silver nanoparticles 20 dispersed therein.

Figure 6:
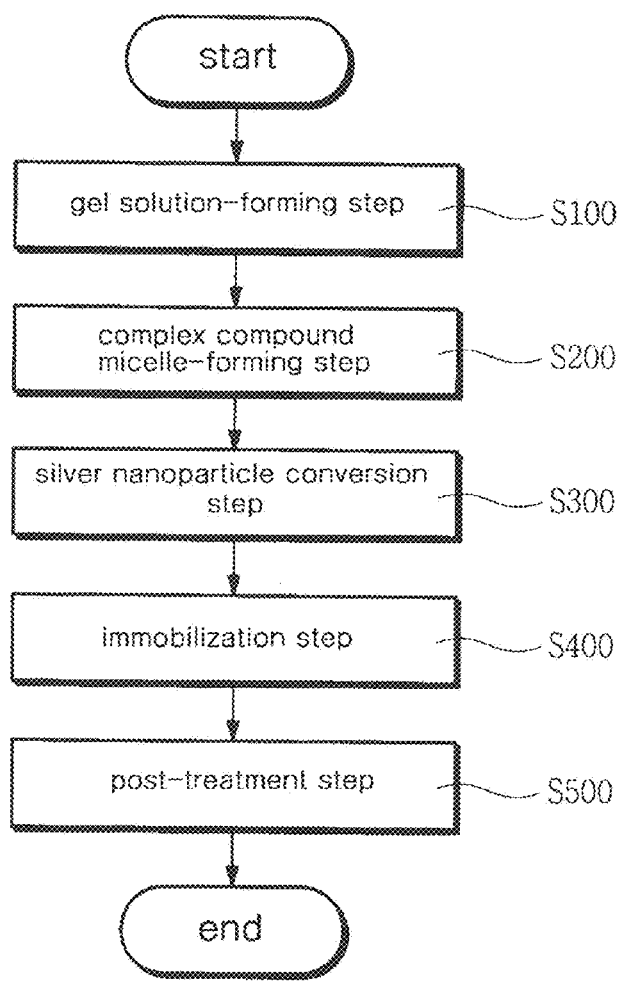
FIG. 6 is a process block diagram showing a method for preparing spherical mesoporous silica containing silver nanoparticles dispersed therein according to another embodiment of the present invention.

The method of preparing spherical mesoporous silica containing silver nanoparticles dispersed therein by the post-reduction process according to another embodiment of the present invention will now be described in detail with reference to FIGS. 5 and 6. The method according to another embodiment of the present invention comprises the steps of:

(S100) adding a template to an aqueous alcohol solution, and then heating and dissolving the template, followed by cooling to room temperature, thereby forming a gel having a micelle structure (a gel solution-forming step);

(S200) adding a 5% silver nitrate solution to the gel solution to form an aqueous solution of a silver ion-amine complex compound (a complex compound micelle-forming step);

(S300) adding a reducing agent to convert the silver ions in the silver ion-amine complex compound to silver nanoparticles (a silver nanoparticle conversion step);

(S400) adding a silica precursor to the gel solution containing the silver nanoparticles dispersed therein, followed by stirring to form spherical mesoporous silica by a sol-gel process and to attach the silver nanoparticles to the inside of the spherical mesoporous silica (an immobilization step); and (S500) filtering the spherical mesoporous silica using a vacuum system, removing the remaining reducing agent from the filtered spherical mesoporous silica, and removing dodecylamine present in the spherical mesoporous silica with hot ethanol, followed by drying (a post-treatment step).

The method of preparing spherical mesoporous silica by the pre-reduction process according to the present invention is carried out in the same manner as the post-reduction process, except that the nanoparticle conversion step (S300) and the immobilization step (S400) are carried out instead of the immobilization step (P300) and the nanoparticle conversion step (P400), respectively.

Thus, the spherical mesoporous silica containing silver nanoparticles dispersed therein, prepared by the preparation method of the present invention, is cost-effective compared to a conventional method, that uses silver nanoparticles as a raw material, because the silver nitrate solution that is inexpensive compared to silver nanoparticles is used. Also, the spherical mesoporous silica can be with high productivity in large amounts, and thus is easily commercialized. Moreover, because silver nanoparticles are incorporated into the pores of the mesoporous silica, the silver nanoparticles are used stably and do not change color and odor. In addition, the mesoporous silica of the present invention exhibits various additional effects, including far-infrared ray emission and deodorization, attributable to mesoporous silica having a large specific surface area.

Hereinafter, the present invention will be described in detail with reference to examples, but the scope of the present invention is not limited by these examples.

1. Preparation of spherical mesoporous silica containing silver nanoparticles dispersed therein

EXAMPLE 1

Preparation of Mesoporous Silica Containing Silver Nanoparticles by Post-Reduction Process 1 mole of dodecylamine was added to 20 L of 10% ethyl alcohol aqueous solution, and the mixture was stirred at a temperature of 60±1 □ for 1 hour until the ethyl alcohol aqueous solution became clear. Then, the stirred solution was cooled to room temperature, thereby forming a gel having a micelle structure. Then, 0.1 moles of a 5% silver nitrate solution were added to the gel which was then stirred at room temperature for 10 minutes to form a silver ion-amine complex compound in the gel solution. Then, 3.6 moles of tetraethoxyorthosilicate (TEOS) as a silica precursor were added to the gel solution which was then strongly stirred at room temperature for 1 hour to form spherical mesoporous silica by a sol gel process and to attach the silver ion-amine complex compound to the inside of the spherical mesoporous silica. Then, 0.2 moles of $NaBH_4$ as a reducing agent were added thereto to convert silver ions in the silver ion-amine complex compound, attached to the inside of the spherical mesoporous silica, to silver nanoparticles. Then, the resulting mesoporous silica was filtered under a vacuum of 30 mmHg, and then washed 3 times with 200 ml of distilled water, after which it was washed 3 times with 100 ml of ethyl alcohol at 60 □, and then dried at a temperature of 80±2 □ for 24 hours, thereby preparing spherical mesoporous silica containing silver nanoparticles dispersed therein.

EXAMPLE 2

Preparation of Mesoporous Silica Containing Silver Nanoparticles by Post-Reduction Process 1 mole of decaneamine was added to 24 L of 10% ethyl alcohol aqueous solution, and the mixture was stirred at a temperature of 60±1 □ for 1 hour until the ethyl alcohol aqueous solution became clear. Then, the stirred solution was cooled to room temperature, thereby forming a gel having a micelle structure. Then, 0.3 moles of a 5% silver nitrate solution was added to the gel which was then stirred at room temperature for 10 minutes, thereby forming an aqueous solution of a silver ion-amine complex compound. Then, 0.6 moles of $NaBH_4$ as a reducing agent were added thereto to convert silver ions in the silver ion-amine complex compound to silver nanoparticles, and the mixture was strongly stirred and 4.4 moles of tetramethoxyorthosilicate (TMOS) were added to the gel solution which was then strongly stirred at room temperature for 2 hours to form spherical mesoporous silica by a sol-gel process and to attach the silver nanoparticles to the inside of the spherical mesoporous silica. Then, the resulting mesoporous silica was filtered under a vacuum of 30 mmHg, and then washed 3 times with 200 ml of distilled water, after which it was washed 3 times with 100 ml of ethyl alcohol at 60 □, and then dried at a temperature of 80±2 □ for 24 hours, thereby preparing spherical mesoporous silica containing silver nanoparticles dispersed therein.

Figure 7:
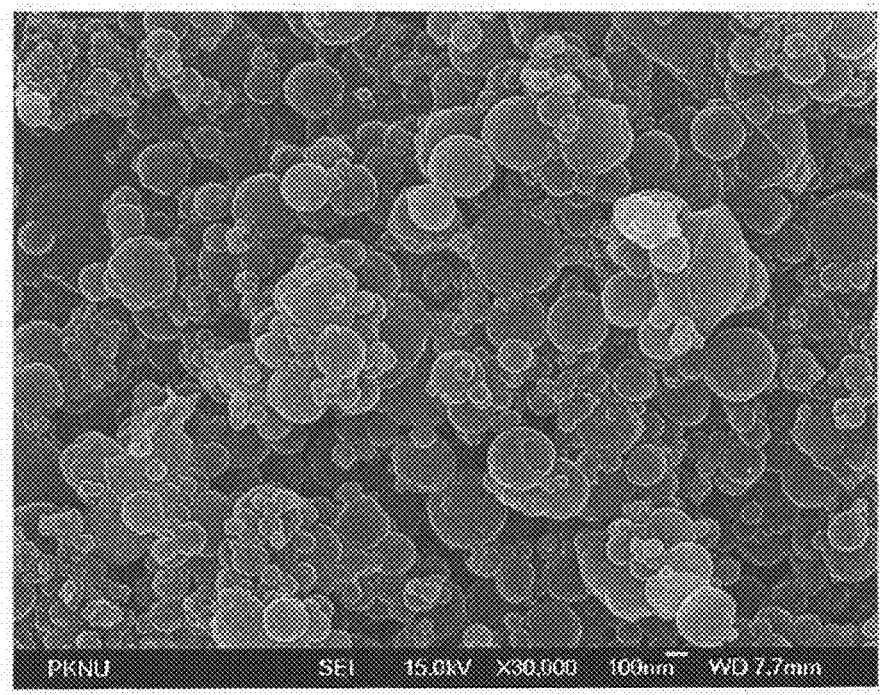
FIG. 7 is a SEM photograph (30,000× magnification) of spherical mesoporous silica containing silver nanoparticles dispersed therein according to Example 1 of the present invention.
Figure 8:
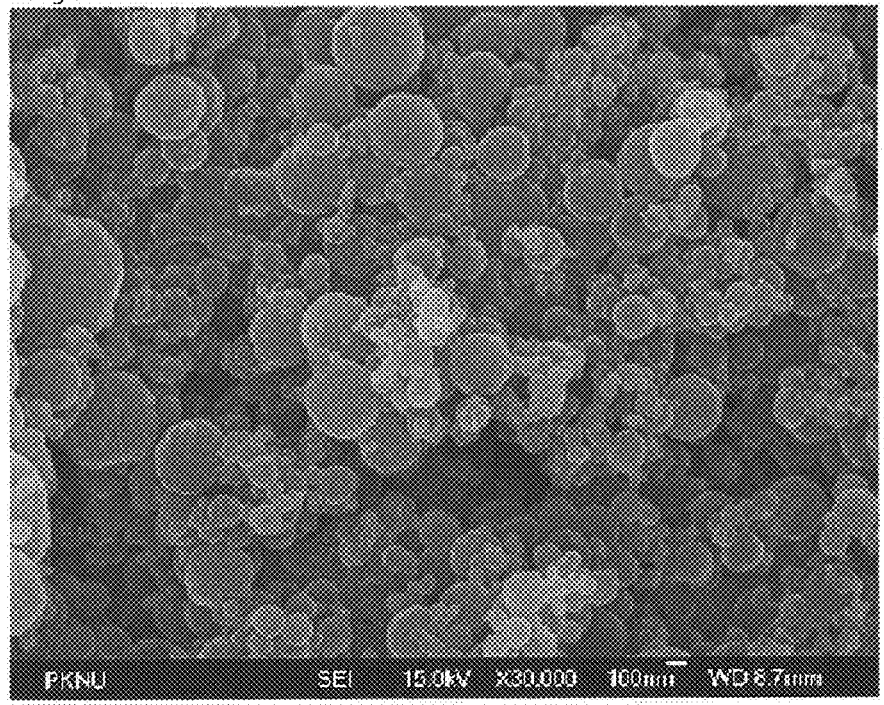
FIG. 8 is a SEM photograph (30,000× magnification) of spherical mesoporous silica containing silver nanoparticles dispersed therein according to Example 2 of the present invention.

2. Observation of spherical mesoporous silica containing silver nanoparticles dispersed therein The spherical mesoporous silica containing silver nanoparticles dispersed therein, prepared in each of Examples 1 and 2, was photographed with a SEM, and the photographs were observed. As a result, as can be seen in FIGS. 7 and 8, almost all the silica particles were uniformly spherical. The spherical mesoporous silica, particles containing silver nanoparticles dispersed therein had a particle size of about 50-500 nm.

FIG. 7 is a SEM photograph of spherical mesoporous silica containing silver nanoparticles dispersed therein according to Example 1 of the present invention, and FIG. 8 is a SEM photograph of spherical mesoporous silica containing silver nanoparticles dispersed therein, according to Example 2 of the present invention.

Figure 9:
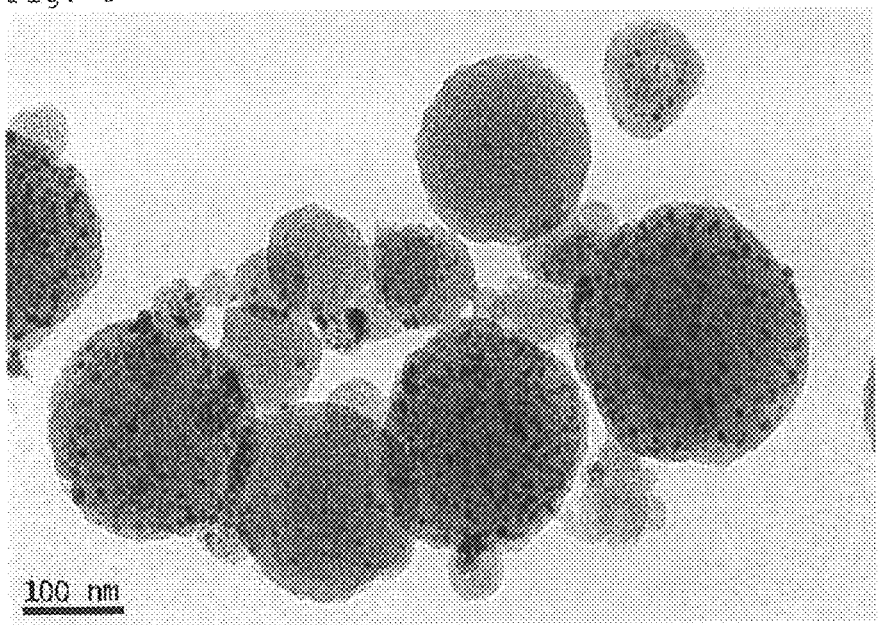
FIG. 9 is a SEM photograph (30,000× magnification) of spherical mesoporous silica containing silver nanoparticles dispersed therein according to Example 1 of the present invention.
Figure 10:
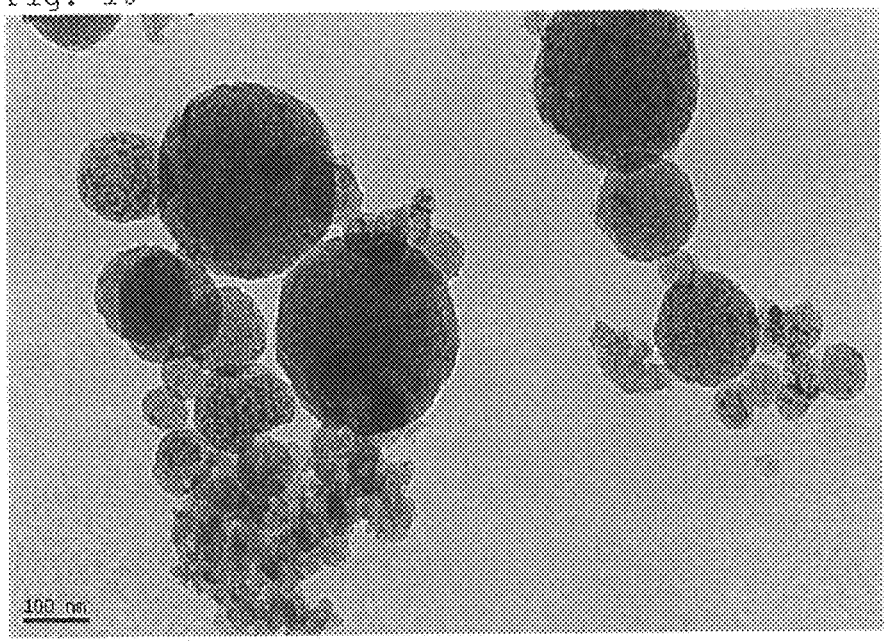
FIG. 10 is a SEM photograph (30,000× magnification) of spherical mesoporous silica containing silver nanoparticles dispersed therein according to Example 2 of the present invention.

In addition, the spherical mesoporous silica containing silver nanoparticles dispersed therein, prepared in each of Examples 1 and 2, was photographed with a SEM, and the photographs were observed. As a result, as shown in FIGS. 9 and 10, almost all the silica particles were uniformly spherical and were in the form of silica nanoballs having high dispersion ability, and silver nanoparticles were uniformly dispersed in the mesopores of the spherical mesoporous silica. As can be seen by black dots in FIGS. 9 and 10, the silver nanoparticles had a particle size of about 1-5 nm. In addition, the spherical mesoporous silica prepared in each of Examples 1 and 2 is porous, and thus is very light in weight.

Figure 11:
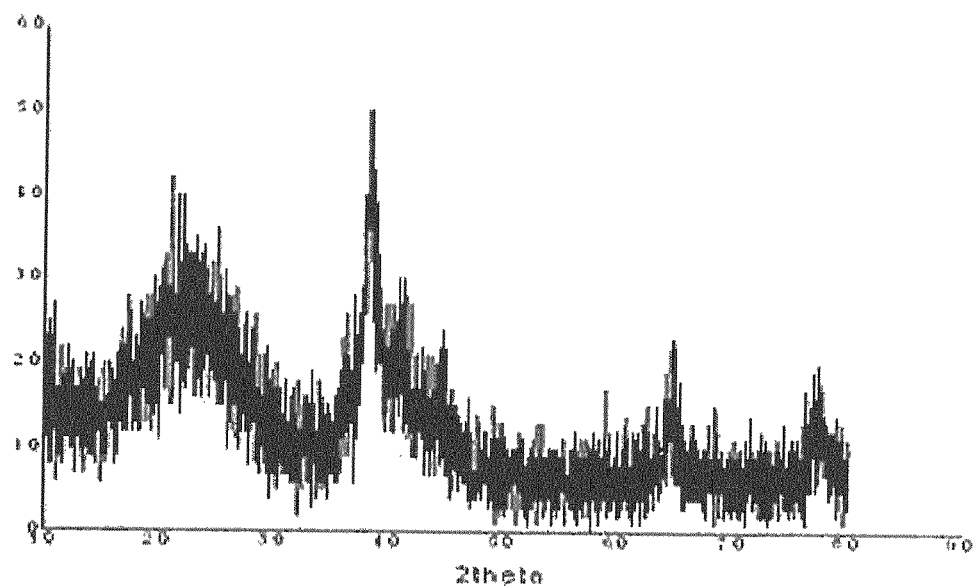
FIG. 11 is a XRD graph for silver nanoparticles synthesized by a post-reduction process according to Example 1 of the present invention.

FIG. 11 is a XRD graph for silver nanoparticles synthesized by a post-reduction process according to Example 1 of the present invention.

Figure 12:
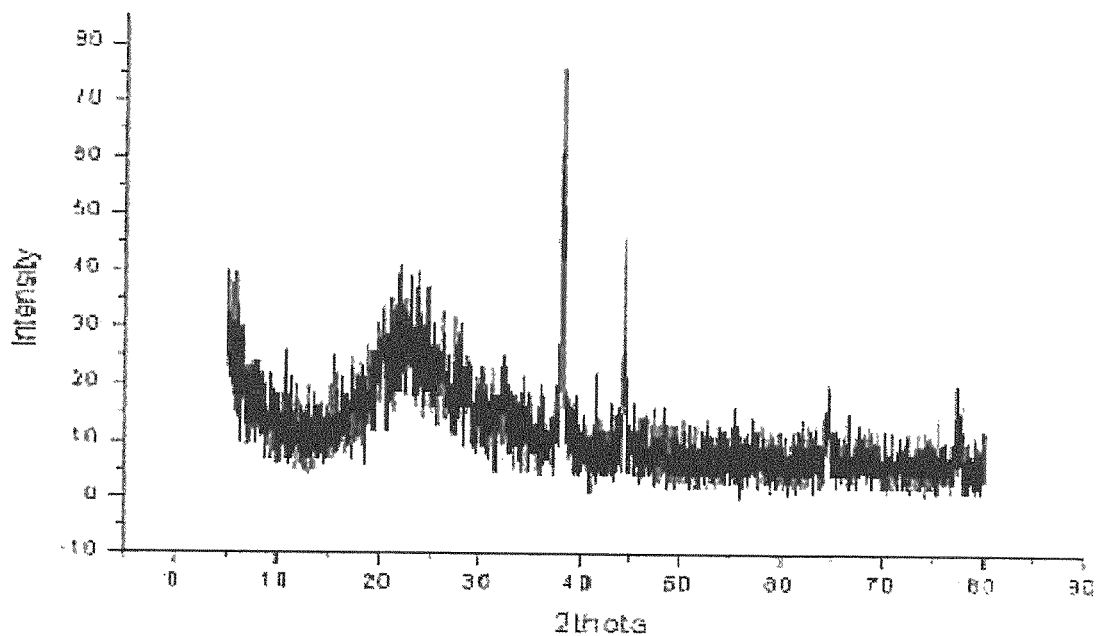
FIG. 12 is a XRD graph for silver nanoparticles synthesized by a pre-reduction process according to Example 2 of the present invention.

FIG. 12 is a XRD graph for silver nanoparticles synthesized by a post-reduction process according to Example 2 of the present invention.

Figure 13:
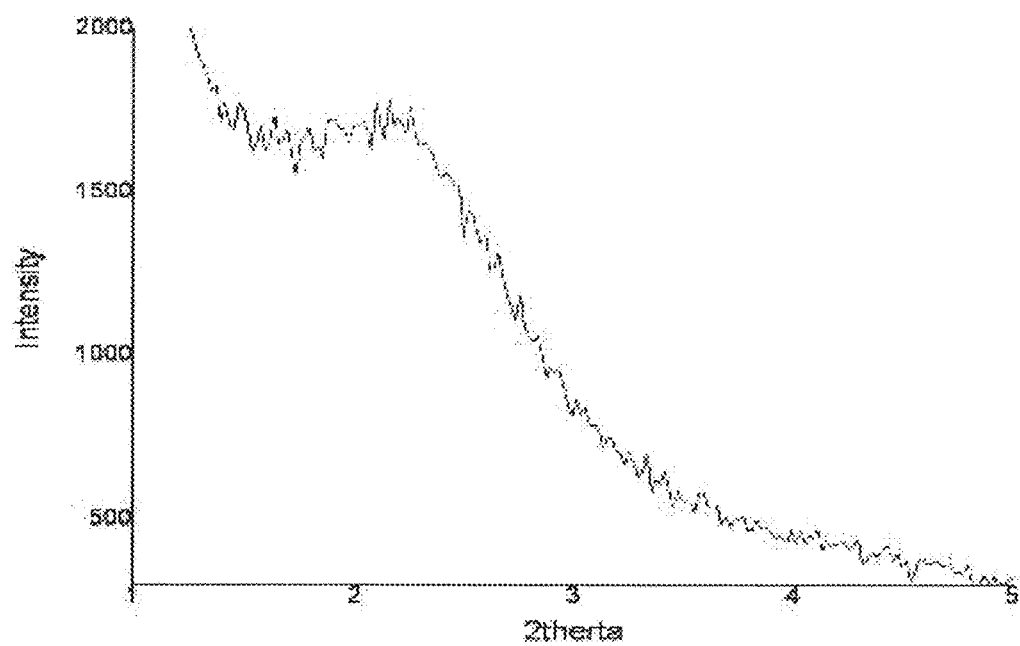
FIG. 13 is a graph showing low-angle XRD data for silver nanoparticles synthesized by a post-reduction process according to Example 1 of the present invention.

FIG. 13 is a graph showing low-angle XRD data for silver nanoparticles synthesized by a post-reduction process according to Example 1 of the present invention.

As can be seen in FIGS. 11 and 12, the 2θ values were exactly consistent with 38.1, 44.2, 64.4 and 77.5, which are the theoretical 2θ values of metal silver, suggesting that silver metal particles are present in the spherical mesoporous silica structures.

As can be seen in FIG. 13, the spherical porous silica of Example 1 showed a low-angle 2θ value of 2.17, a pore interval of about 4 nm and a BET surface area of about 587 $m^2/g$. This suggests that the silica, of Example is mesoporous silica.

In addition, the content of silver nanoparticles in the spherical mesoporous silica containing silver nanoparticles dispersed therein, prepared in each of Examples 1 and 2, was measured using a scanning electron microscope (SEM-EDAX), and the results of the measurement are shown in Table 1 below.

TABLE 1

(Unit: wt %)

| Elements | Examples | |
|---|---|---|
| | 1 | 2 |
| O | 59.11 | 59.25 |
| Si | 31.82 | 31.95 |
| Ag | 9.06 | 8.77 |
| Others | 0.01 | 0.03 |

As can be seen in Table 1 above, as the amount of silver nitrate aqueous solution added in Example 2 was increased compared to that in Example, the content of silver nanoparticles in Example 2 was increased compared to that in Example 1.

The silica of each of Examples 1 and 2 was tested for antibacterial activities against E. coli and Staphylococcus aureus according to a film-attached method ($1×10^7$ cfu/ml). As a result, the antibacterial activities of the silica of Example 1 against E. coli and Staphylococcus aureus were 7 log and 6 log, respectively, and the antibacterial activities of the silica of Example 2 were 7 log and 6 log, respectively, suggesting that the silica particles of Examples 1 and 2 had excellent antibacterial activities.

Figure 14:
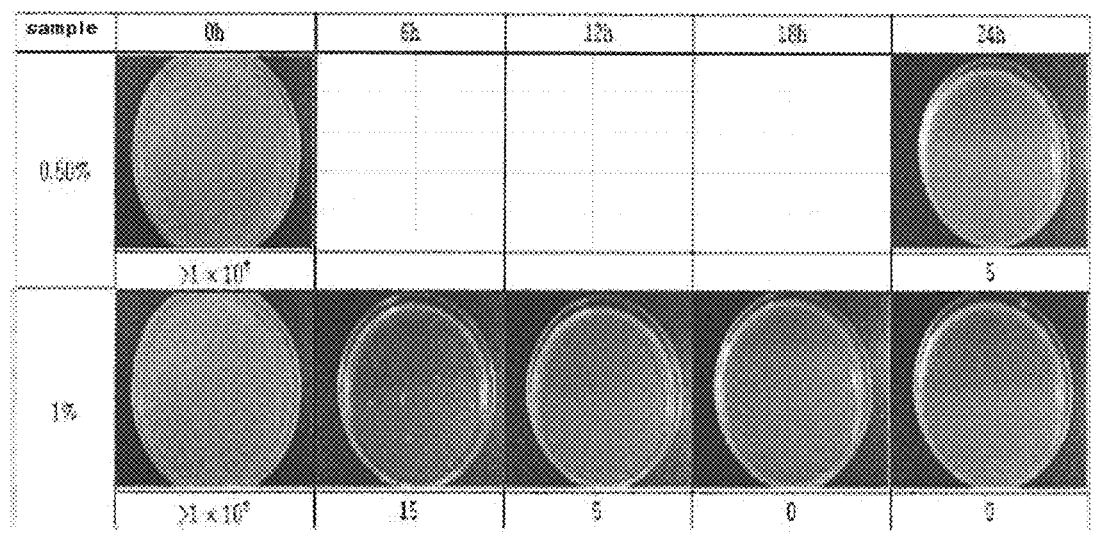
FIGS. 14 and 15 are photographs showing the results of an antibacterial activity test for paints in which spherical mesoporous silica particles containing silver nanoparticles dispersed therein according to Example 1 of the present invention were dispersed.
Figure 15:
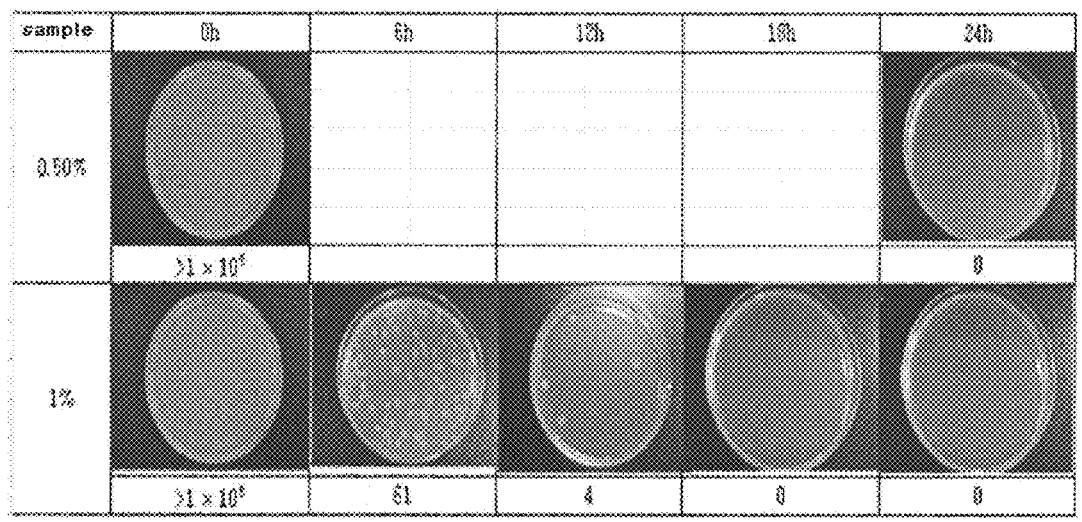

For reference, FIGS. 14 and 15 are photographs showing the results of antibacterial activity tests for paints in which spherical mesoporous silica particles containing silver nanoparticles dispersed therein according to Example 1 of the present invention were dispersed.

FIG. 14 is a photograph showing the results of a test for antibacterial activity against S. aureus as a function of time. As can be seen therein, in a paint in which the spherical mesoporous silica containing silver nanoparticles was dispersed at a concentration of 0.5%, the number of S. aureus cells was larger than $1×10^5$ cells at 0 h, but was 0 at 24 h. In a paint in which the spherical mesoporous silica containing silver nanoparticles was dispersed at a concentration of 1%, the number of S. aureus cells was larger than $1×10^5$ cells at 0 h, but decreased gradually with the passage of time and reached 0 at 18 h.

FIG. 15 is a photograph showing the results of a test for antibacterial activity against E. coli as a function of time. As can be seen therein, in a paint in which the spherical mesoporous silica containing silver nanoparticles was dispersed at a concentration of 0.5%, the number of E. coli cells was larger than $1×10^5$ cells at 0 h, but was 0 at 24 h. In a paint in which the spherical mesoporous silica containing silver nanoparticles was dispersed at a concentration of 1%, the number of E. coli cells was larger than $1×10^5$ cells at 0 h but decreased gradually with the passage of time and reached 0 at 18 h.

As can be seen in Examples 1 and 2 above, according to the present invention, spherical mesoporous silica containing silver nanoparticles dispersed therein is prepared by adding a silver nitrate solution to an aqueous surfactant solution and performing a sol-gel process. Thus, the spherical mesoporous silica of the present invention is cost-effective compared to a conventional method that uses silver nanoparticles as a raw material, because the silver nitrate solution that is inexpensive compared to silver nanoparticles is used. Also, the spherical mesoporous silica can be with high productivity in large amounts, and thus is easily commercialized. Moreover, because silver nanoparticles are incorporated into the pores of the mesoporous silica, the silver nanoparticles are used stably and do not change color and odor. In addition, the mesoporous silica of the present invention exhibits various additional effects, including far-infrared ray emission and deodorization, attributable to silica.

While the preferred embodiments of the present invention have been described with reference to the drawings, this description is illustrative only and those skilled in the art will appreciate that various modifications, additions and substitutions are possible, without departing from the scope and spirit of the invention

MODE FOR INVENTION

In one embodiment, the present invention is directed to a method for preparing spherical mesoporous silica containing silver nanoparticles dispersed therein, the method comprising the steps of:

(P100) adding a template, to an aqueous alcohol solution, and then heating and dissolving the template, followed by cooling to room temperature, thereby forming a gel having a micelle structure (a gel solution-forming step);

(P200) adding a 5% silver nitrate solution to the gel solution to form an aqueous solution of a silver ion-amine complex compound (a complex compound micelle-forming step);

(P300) adding a silica, precursor to the gel solution containing the silver ion-amine complex compound formed therein, followed by stirring to form spherical mesoporous silica by a sol-gel process and to attach the silver ion-amine complex compound to the inside of the spherical mesoporous silica (an immobilization step);

(P400) adding a reducing agent to convert the silver ions in the silver ion-amine complex compound attached to the inside of the spherical mesoporous silica to silver nanoparticles (a silver nanoparticle conversion step); and (P500) filtering the spherical mesoporous silica using a vacuum system, removing the remaining reducing agent from the filtered spherical mesoporous silica, and removing dodecylamine present in the spherical mesoporous silica with hot ethanol, followed by drying (a post-treatment step).

In another embodiment, the present invention is directed to a method for preparing spherical mesoporous silica containing silver nanoparticles dispersed therein, the method comprising the steps of:

(S100) adding a template to an aqueous alcohol solution, and then heating and dissolving the template, followed by cooling to room temperature, thereby forming a gel having a micelle structure (a gel solution-forming step);

(S200) adding a 5% silver nitrate solution to the gel solution to form an aqueous solution of a silver ion-amine complex compound (a complex compound, micelle-forming step);

(S300) adding a reducing agent to convert the silver ions in the silver ion-amine complex compound to silver nanoparticles (a silver nanoparticle conversion step);

(S400) adding a silica precursor to the gel solution containing the silver nanoparticles dispersed therein, followed by stirring to form spherical mesoporous silica by a sol-gel process and to attach the silver nanoparticles to the inside of the spherical mesoporous silica (an immobilization step); and (S500) filtering the spherical mesoporous silica using a vacuum system, removing the remaining reducing agent from the filtered spherical mesoporous silica, and removing dodecylamine present in the spherical mesoporous silica with hot ethanol, followed by drying (a post-treatment step).

In still another embodiment, the present invention is directed to spherical mesoporous silica containing silver nanoparticles dispersed therein, prepared by the above preparation method.

In the present invention, the aqueous alcohol solution is preferably a mixture of 5-10 wt % of alcohol and 90-95 wt % of purified water.

The template is preferably added in an amount of 1.0 mole per 20-24 L to form the micelle structure.

The 5% silver nitrate solution is preferably added in an amount of 0.1-0.3 moles per mole of the template.

The precursor is preferably added in an amount of 3.6-4.4 moles per mole of the template.

The reducing agent is preferably added in an amount of 0.2-0.6 moles per mole of the template.

The template is preferably one or more selected from among alkylamines having 1 to 16 carbon atoms.

The alcohol is preferably one or more selected from among ethanol, methanol, propanol, butanol and pentanol.

The silica precursor is preferably one selected from among tetraethoxyorthosilicate (TEOS), tetramethoxyorthosilicate (TMOS), tetrapropoxyorthosilicate (TPOS), tetrabutoxyorthosilicate (TBOS), tetrapentoxyorthosilicate (TPEOS), tetra(methylethylketoxime)silane, vinyl oxime silane (VOS), phenyl tris(butanone oxime)sliane (POS), and methyl oxime silane (MOS).

The reducing agent is preferably one or more selected from among $NaBH_4$, $NH_2NH_2$, $NH_3$ and $H_2S$.

INDUSTRIAL APPLICABILITY

As described above, according to the present invention, spherical mesoporous silica is prepared using an inexpensive silver nitrate solution. Thus, the spherical mesoporous silica of the present invention is cost-effective. Also, it can be produced with high productivity in large amounts, and thus can be easily commercialized. In addition, because silver nanoparticles are incorporated into the mesoporous silica, the stability of the silver nanoparticles is ensured, and thus the mesoporous silica can be widely used in various industrial fields.

The invention claimed is:
1. A method for preparing spherical mesoporous silica containing silver nanoparticles dispersed therein, the method comprising the steps of:
   (P100) adding a template to an aqueous alcohol solution, and then heating and dissolving the template, followed by cooling to room temperature, thereby forming a gel having a micelle structure;
   (P200) adding a 5% silver nitrate solution to the gel solution to form an aqueous solution of a silver ion-amine complex compound;
   (P300) adding a silica precursor to the gel solution containing the silver ion-amine complex compound formed therein, followed by stirring to form spherical mesoporous silica by a sol-gel process and to attach the silver ion-amine complex compound to the inside of the spherical mesoporous silica;
   (P400) adding a reducing agent to convert silver ions in the silver ion-amine complex compound, attached to the inside of the spherical mesoporous silica, to silver nanoparticles; and
   (P500) filtering the spherical mesoporous silica using a vacuum system, removing the remaining reducing agent from the filtered spherical mesoporous silica, and removing dodecylamine present in the spherical mesoporous silica with hot ethanol, followed by drying.

2. The method of claim 1, wherein the aqueous alcohol solution is a mixture of 5-10 wt % of alcohol and 90-95 wt % of purified water.

3. The method of claim 1, wherein the template is added in an amount of 1.0 mole per 20-24 L to form the micelle structure.

4. The method of claim 1, wherein the silver nitrate solution is added in an amount of 0.1-0.3 moles per mole of the template.

5. The method of claim 1, wherein the precursor is added in an amount of 3.6-4.4 moles per mole of the template.

6. The method of claim 1, wherein the reducing agent is added in an amount of 0.2-0.6 moles per mole of the template.

7. The method of claim 1, wherein the template is one or more selected from among alkylamines having 1 to 16 carbon atoms.

8. The method of claim 1, wherein the silica precursor is one selected from among tetraethoxyorthosilicate (TEOS), tetramethoxyorthosilicate (TMOS), tetrapropoxyorthosilicate (TPOS), tetrabutoxyorthosilicate (TBOS), tetrapentoxyorthosilicate (TPEOS), tetra(methylethylketoxime)silane, vinyl oxime silane (VOS), phenyl tris(butanone oxime)sliane (POS), and methyl oxime silane (MOS).

9. The method of claim 1, wherein the reducing agent is one or more selected from among $NaBH_4$, $NH_2NH_2$, $NH_3$, and $H_2S$.

10. A method for preparing spherical mesoporous silica containing silver nanoparticles dispersed therein, the method comprising the steps of:
    (S100) adding a template to an aqueous alcohol solution, and then heating and dissolving the template, followed by cooling to room temperature, thereby forming a gel having a micelle structure (a gel solution-forming step);
    (S200) adding a 5% silver nitrate solution to the gel solution to form an aqueous solution of a silver ion-amine complex compound;
    (S300) adding a reducing agent to convert silver ions in the silver ion-amine complex compound to silver nanoparticles;
    (S400) adding a silica precursor to the gel solution containing the silver nanoparticles dispersed therein, followed by stirring to form spherical mesoporous silica by a sol-gel process and to attach the silver nanoparticles to the inside of the spherical mesoporous silica; and
    (S500) filtering the spherical mesoporous silica using a vacuum system, removing the remaining reducing agent from the filtered spherical mesoporous silica, and removing dodecylamine present in the spherical mesoporous silica with hot ethanol, followed by drying.

11. The method of claim 10, wherein the aqueous alcohol solution is a mixture of 5-10 wt % of alcohol and 90-95 wt % of purified water.

12. The method of claim 10, wherein the template is added in an amount of 1.0 mole per 20-24 L to form the micelle structure.

13. The method of claim 10, wherein the silver nitrate solution is added in an amount of 0.1-0.3 moles per mole of the template.

14. The method of claim 10, wherein the precursor is added in an amount of 3.6-4.4 moles per mole of the template.

15. The method of claim 10, wherein the reducing agent is added in an amount of 0.2-0.6 moles per mole of the template.

16. The method of claim 10, wherein the template is one or more selected from among alkylamines having 1 to 16 carbon atoms.

17. The method of claim 10, wherein the silica precursor is one selected from among tetraethoxyorthosilicate (TEOS), tetramethoxyorthosilicate (TMOS), tetrapropoxyorthosilicate (TPOS), tetrabutoxyorthosilicate (TBOS), tetrapentoxyorthosilicate (TPEOS), tetra(methylethylketoxime)silane, vinyl oxime silane (VOS), phenyl tris(butanone oxime)sliane (POS), and methyl oxime silane (MOS).

18. The method of claim 10, wherein the reducing agent is one or more selected from among $NaBH_4$, $NH_2NH_2$, $NH_3$, and $H_2S$.

* * * * *